(12) United States Patent
Morel et al.

(10) Patent No.: US 6,685,247 B2
(45) Date of Patent: Feb. 3, 2004

(54) GRIPPING DEVICE ADAPTED TO BE MOUNTED ON THE ARM OF A ROBOT

(75) Inventors: Michel Morel, Ermont (FR); Fabrice Roudier, Juziers (FR)

(73) Assignee: Genus Technologies, Chatillon (FR)

( * ) Notice: Subject to any disclaimer, the term of this patent is extended or adjusted under 35 U.S.C. 154(b) by 0 days.

(21) Appl. No.: 10/022,374

(22) Filed: Dec. 20, 2001

(65) Prior Publication Data
US 2002/0074814 A1 Jun. 20, 2002

(30) Foreign Application Priority Data

Dec. 20, 2000 (FR) .............................. 00 16690

(51) Int. Cl.[7] .............................................. B25J 15/04
(52) U.S. Cl. .................... 294/81.2; 294/81.6; 294/65; 901/49
(58) Field of Search ................ 294/81.1, 81.2, 294/81.5, 81.6, 65, 67.1; 901/27, 28, 30, 40, 49

(56) References Cited

U.S. PATENT DOCUMENTS

| | | | | |
|---|---|---|---|---|
| 4,129,328 A | * | 12/1978 | Littell | 294/65 |
| 4,482,289 A | * | 11/1984 | Inaba et al. | 414/736 |
| 4,650,234 A | | 3/1987 | Blatt | |
| 4,685,714 A | * | 8/1987 | Hoke | 294/81.2 |
| 5,152,566 A | * | 10/1992 | Blatt et al. | 294/81.2 |
| 5,746,567 A | * | 5/1998 | Herbermann et al. | 414/749.6 |
| 6,502,877 B2 | * | 1/2003 | Schick et al. | 294/65 |

FOREIGN PATENT DOCUMENTS

| | | |
|---|---|---|
| DE | 296 22 169 | 3/1997 |
| EP | 1 020 259 | 7/2000 |
| FR | 2 427 883 | 1/1980 |
| FR | 2 796 875 | 2/2001 |
| JP | 4-201095 | 7/1992 |

* cited by examiner

Primary Examiner—Dean J. Kramer
(74) Attorney, Agent, or Firm—Young & Thompson (57) ABSTRACT

A gripping device, adapted to be mounted on a robot arm, includes a central beam (1) having high characteristics of inertia in flexure and in torsion, and at least one arm (11–27) secured removably to the beam and adapted to support a member for positioning, holding or gripping a piece of automobile body work.

18 Claims, 6 Drawing Sheets

GRIPPING DEVICE ADAPTED TO BE MOUNTED ON THE ARM OF A ROBOT

BACKGROUND OF THE INVENTION

The invention relates to a gripping device adapted to be mounted on the arm of a robot, particularly to grasp and position a piece of automobile body work.

DESCRIPTION OF THE RELATED ART

There are known gripping devices, particularly devices produced and sold by the French company M.F.G., which have a structure provided by the three-dimensional assembly of individual elements connected by securement stays.

There are also known gripping devices comprising a tubular central portion on which are mounted adjustable sliding collars.

In these two types of known devices, the arms mounted on the central structure are not positioned with the desired precision and have drawbacks from insufficient inertia leading to excessive bending of the ends, and insufficient rigidity.

SUMMARY OF THE INVENTION

The invention has for its object to overcome the mentioned drawbacks, by providing a new gripping device comprising modular elements, which can be assembled with high precision, such that the produced assembly has high rigidity and strength that is satisfactory over time.

The invention has for its object a gripping device adapted to be mounted on a robot arm, comprising a central beam having good characteristics of inertia in bending and torsion, and at least one arm secured to the beam detachably and adapted to support a member for positioning, holding or gripping a piece of automobile body work.

According to other characteristics of the invention:
- the central beam is hollow, so as to lighten the central beam whilst keeping good characteristics of inertia in bending and torsion,
- each arm comprises an indexing configuration along the central beam and securement means to the central beam,
- the central beam carries on the side opposite the stay for mounting to the robot arm, a plurality of regularly spaced indexing configurations,
- the central beam and each arm are assembled by the use of two rectangular dihedrals indexed relative to each other by coacting indexing configurations,
- the indexing configurations comprise at least one mortis and at least one tenon in the shape of a right prism, preferably substantially parallelepipedal,
- each arm comprises at its end opposite the central beam securement means to secure a member for positioning, holding or gripping a piece of automobile body work,
- each arm comprises a narrowed portion permitting breaking the arm in case of shock against an obstacle or under too great mechanical stress,
- each arm is reversible, so as to limit the number of arms,
- the device comprises at least one pneumatic supply comprising a plurality of tubular conduits supplied by a distributor secured preferably to the central beam.

BRIEF DESCRIPTION OF THE DRAWINGS

The invention will be better understood from the description which follows, given by way of non-limiting example with reference to the accompanying drawings, in which.

DESCRIPTION OF THE PREFERRED EMBODIMENTS

Figure 1:
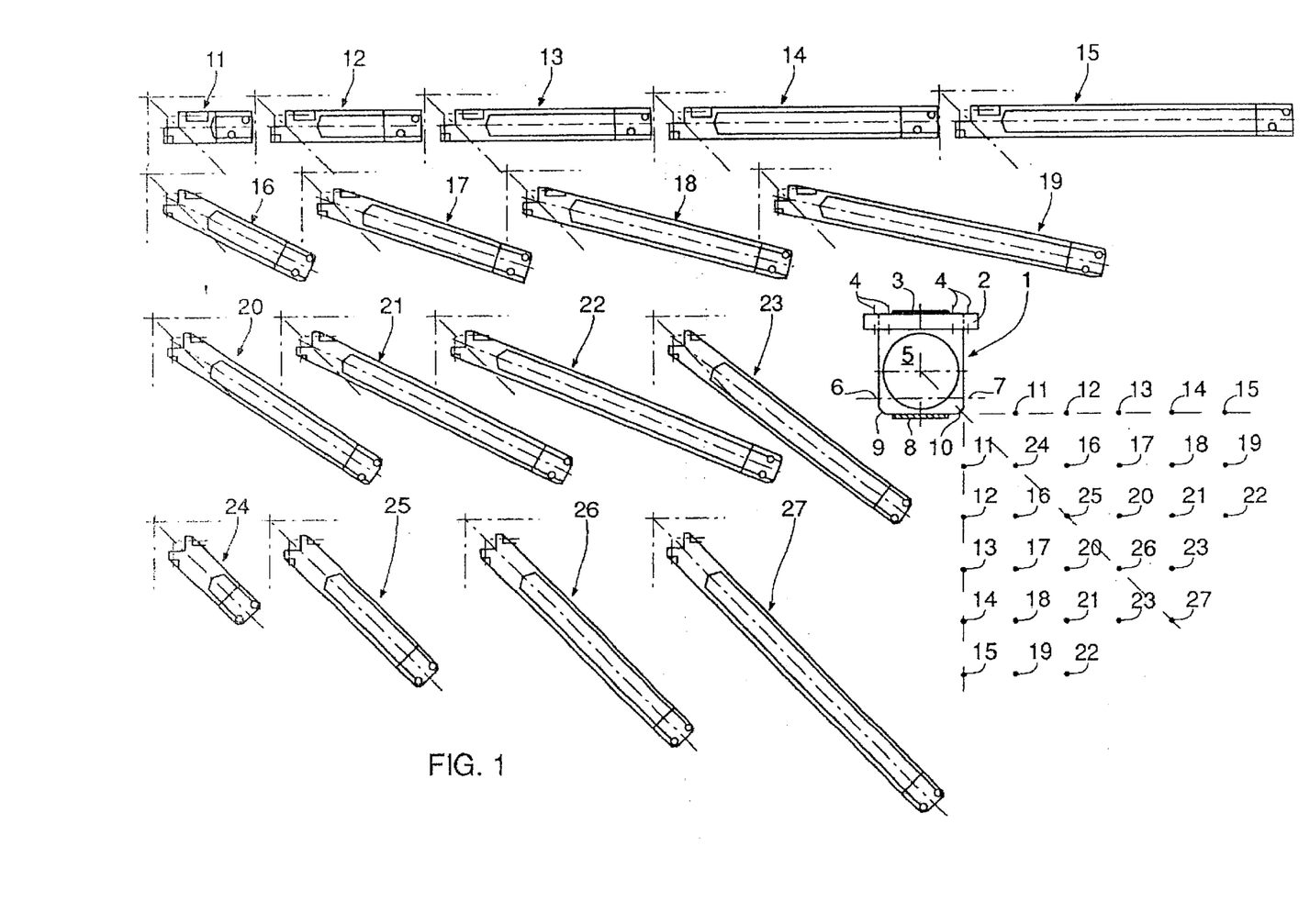
FIG. 1 is an explanatory diagram with a cross-sectional view of the central beam of a device according to the invention and detachable modular arms of a device according to the invention.

With reference to FIG. 1, a device according to the invention comprises a hollow beam 1 seen in transverse cross-section and secured to a securement stay at the end of a robot arm (not shown).

The stay 2 comprises in a manner known per se a plate 3 for centering on the robot arm (not shown) and at least six machined securement screw-threaded holes 4 in the securement stay 2. The stay functions as a securement base or flange for attachment of the beam to a robot arm.

The stay 2 is preferably secured to the beam 1 by screwing after positioning relative to the beam 1 by means of centering pins.

The beam 1 preferably has a substantially square cross-section, or a cross-section which is equivalent in torsion to a square cross-section, and has an internal recess 5 to decrease the mass of the beam.

The recess 5 is for example of circular cross-section, but can also without departing from the scope of the invention have any other cross-section: oval, elliptical, etc. . . . , which does not reduce by more than 20% the torsional and flexural inertia of the beam 1.

Another advantage of the recess 5 is to permit the passage of electrical conduits or pneumatic or hydraulic power tubing or for the transfer of control or positional signals: this passage takes place in a reliable manner, because the conduits or tubing are surrounded and protected by the walls of the beam. Moreover, this arrangement permits reducing the external size of the device according to the invention.

The beam 1 comprises on its side surfaces screw-threaded holes 6, 7 provided at regular intervals and indicated schematically by axial lines, as well as centering machine parts 8 disposed on the opposite surface of the stay 2. Bevils 9 and 10 are provided to permit the application of the arms to the side surface carrying the tapped holes 6 or 7 and on the surface carrying the centering machine parts.

The device according to the invention is designed to associate with the central beam 1, modular arms permitting achieving variable spans with a regular pattern.

The device according to the invention is designed to minimize the number of arms necessary to reach a very extended spatial region about the beam 1.

In the preferred embodiment shown, the invention permits using only 16 different arm modules whose span corresponds to the point of the pattern shown at the lower right angle of the beam 1. Thus, each arm 11 to 27 permits reaching reference points 11 to 27 in the pattern, providing if desired a return of the arm to achieve the lower points of the pattern.

Figure 2:
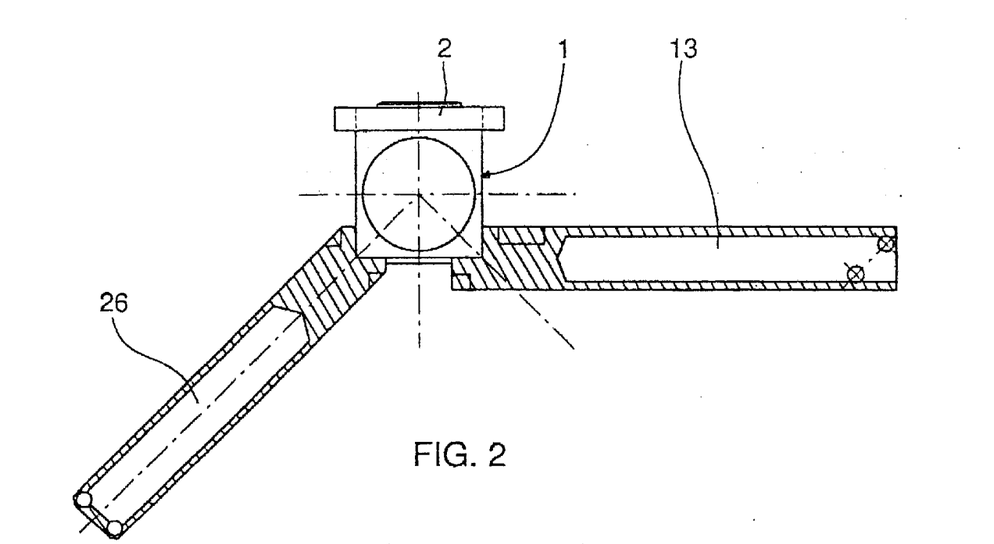
FIG. 2 shows schematically a first embodiment of a device according to the invention comprising a central beam and two assembled arms.

With reference to FIG. 2, elements that are identical or functionally equivalent to the elements of FIG. 1 are shown by reference numerals identical to those of FIG. 1.

The device of FIG. 2 comprises a stay 2 for positioning and securing to an end of a robot (not shown) secured to a beam 1. Arms, for example an arm 13 and an arm 26, are secured by positioning and screwing to the beam 1, so as to form a rigid assembly during movements of the robot. Preferably, each arm 11 to 27 is hollow, so as to decrease its mass and so as to reduce the inertia applied to the end of the robot during its movements.

Figure 3:
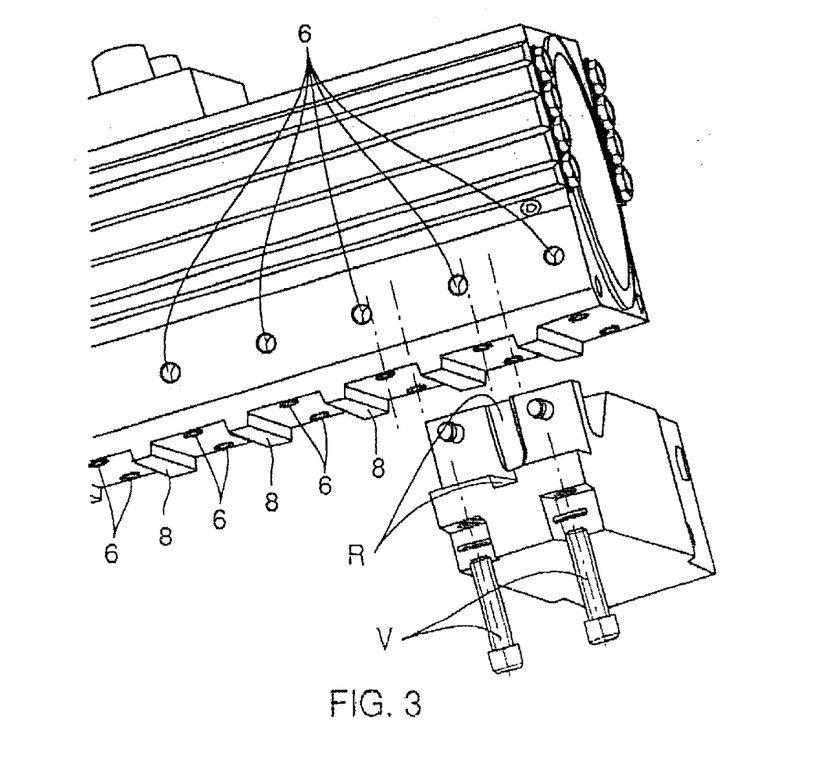
FIG. 3 shows schematically a fragmentary perspective view of an embodiment of a device according to the invention analogous to the embodiment of FIG. 12.

With reference to FIG. 3, the beam 1 comprises tapped holes 6 regularly spaced and centering formations 8 that are substantially parallelepipedal, machined on the lower surface substantially in the medial plane of two consecutive tapped holes 6.

The ends of the arms 11–27 are machined according to coacting shapes, which is to say each having at least one central groove R for indexing on a formation 8 of beam 1.

Each indexing central groove I is disposed between two holes of passage for the securement screw V adapted to be screwed into the tapped holes 6. Each indexing central groove R is disposed between two holes for the passage of a screw in a plane of a rectangular dihedral machined at the end of an arm 11 to 27.

This arrangement ensures the reversibility of the arms 11 to 27 and permits reaching, with a reduced number (17) of arms, all the space around the beam 1.

Beams 1 of different lengths can be provided, preferably of lengths comprised between 500 mm and 3 m.

With reference to FIGS. 4 to 9, the device according to the invention preferably comprises mounting accessories for mounting different accessories of apparatus of known type at the end of the arms of the device.

Figures 4, 5, 6, 7, 8, 9:
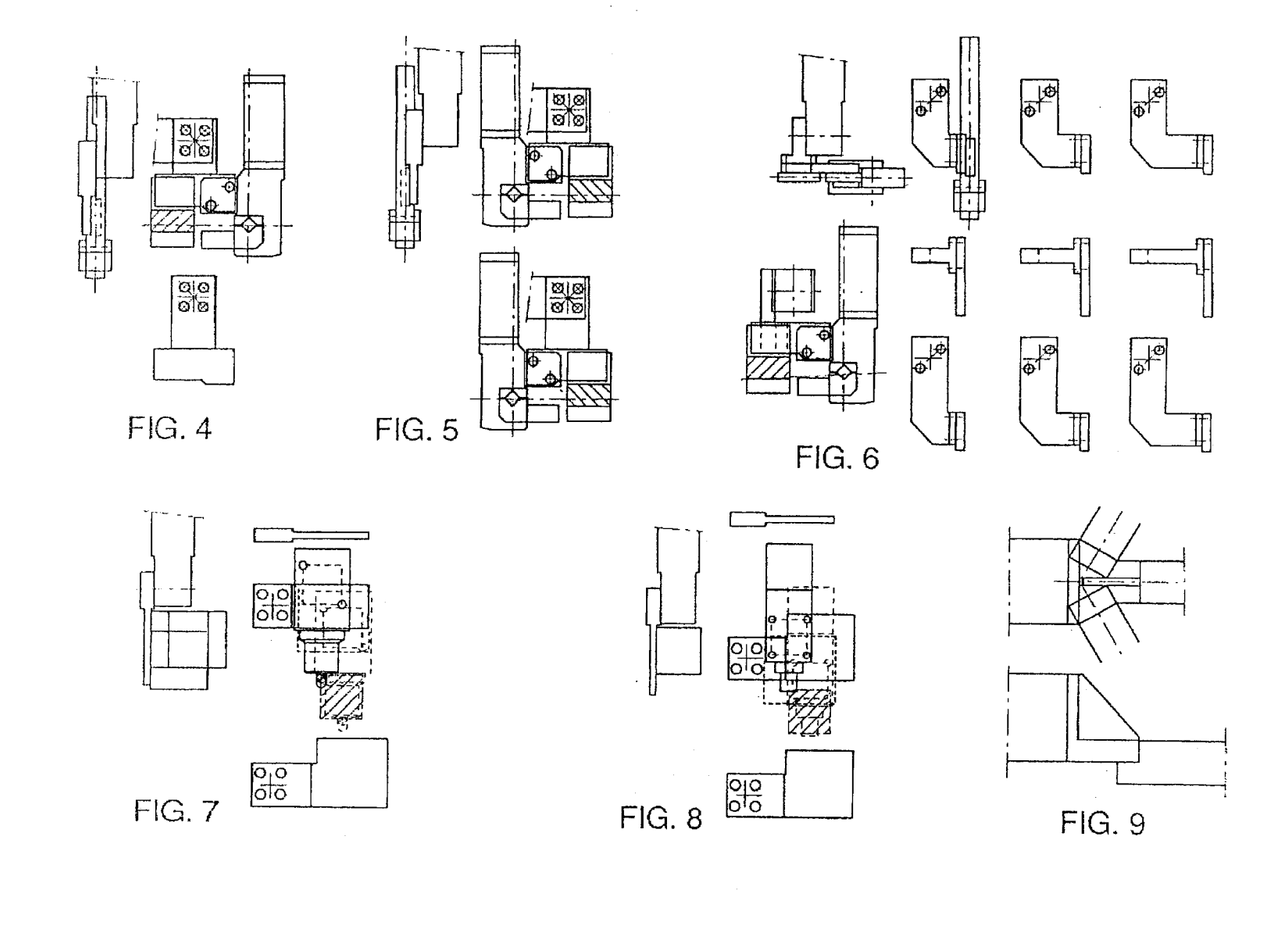
FIGS. 4 to 9 show schematically intermediate mounting accessories of a device according to the invention.

FIG. 4 shows an accessory for mounting a gripper of the type CNOMO size 0, oriented inwardly.

FIG. 5 shows a mounting accessory for a gripper CNOMO size 0 oriented outwardly.

FIG. 6 shows a mounting accessory for a gripper CNOMO size 4 parallel to the beam associated if desired with a square or several blocks of a thickness adapted to fix the position of the gripping.

FIG. 7 shows an accessory for mounting a multi-function mechanism combining two securement plates with a block of greater thickness.

FIG. 8 shows schematically an accessory for pilot mounting combining two plates for securement to a thickening block.

FIG. 9 shows schematically an accessory for mounting an arm at the end of the beam.

Other accessories can if desired be provided, particularly for the connection of the beam and an arm, so as to reach the peaks of a pattern offset in translation relative to the pattern described in FIG. 1. Preferably, such an accessory can have a square shape whose thickness is equal to half the distance between the points of pattern shown in FIG. 1, so as to reach the summits of another pattern defined by points of intersection of the diagonals of the pattern of FIG. 1.

Figure 10:
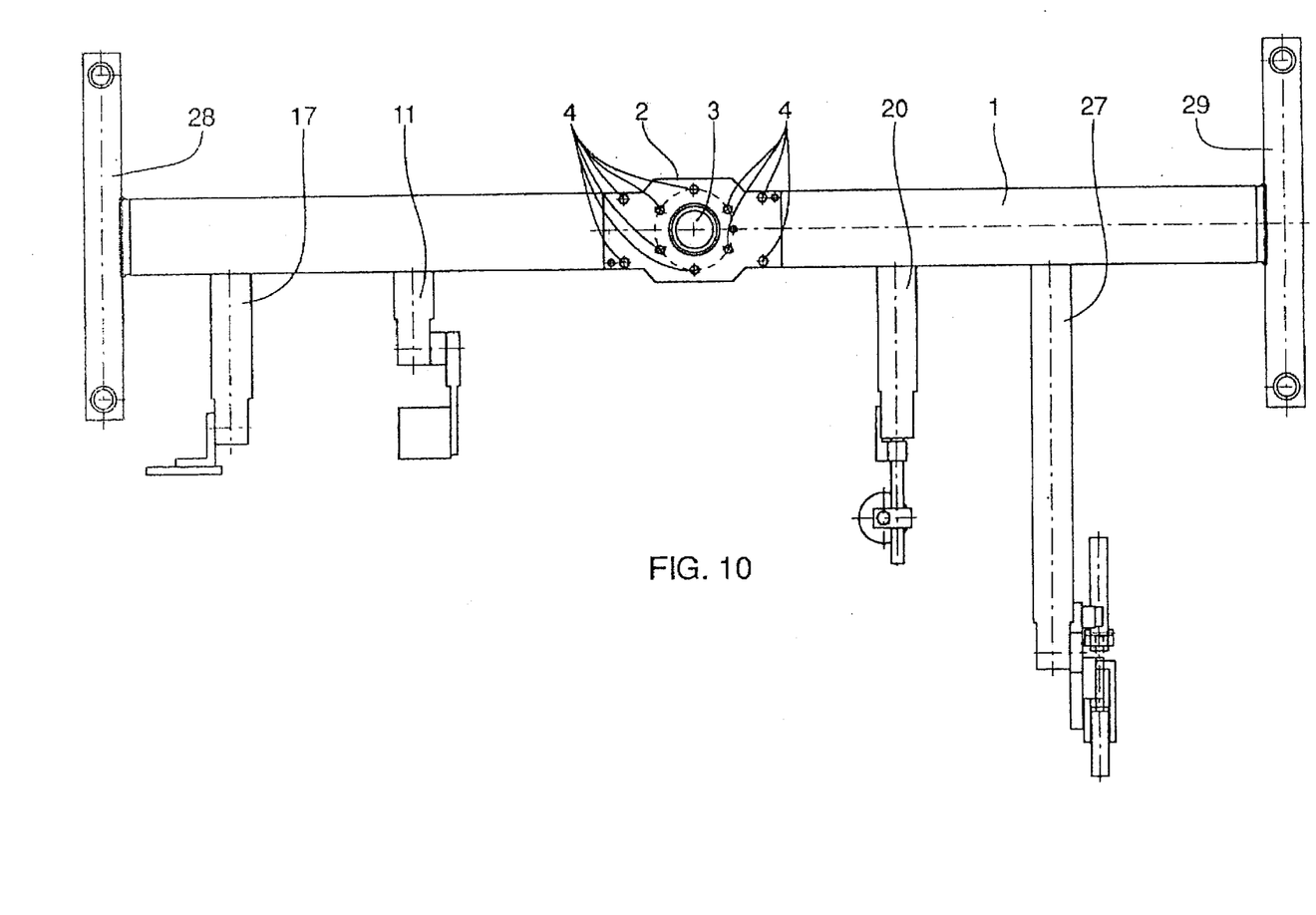
FIG. 10 shows schematically a top plan view of a second embodiment of a device according to the invention.

With reference to FIG. 10, a second embodiment of device according to the invention comprises a beam 1 secured to the securement stay at the end of a robot arm (not shown).

The beam 1 carries arms 17, 11, 20 and 27 and two end cross-pieces 28 and 29 adapted for example to center the gripping device on fixed tool.

The arms 11, 17, 20 and 27 can each carry an accessory for mounting an apparatus for gripping, positioning or folding an element of automobile body work (not shown).

Because of the limited number of mechanical connection interfaces, and of the rigidity of the herringbone structure of the device according to the invention, as well as the low inertia of the device according to the invention, the positioning of the different apparatus mounted on the device according to the invention is precise and invariable during movements of the robot arms adapted to carry the device according to the invention. Moreover, the replacement of the different apparatus mounted on the device according to the invention also takes place while maintaining a precise and invariable positioning.

Figure 11:
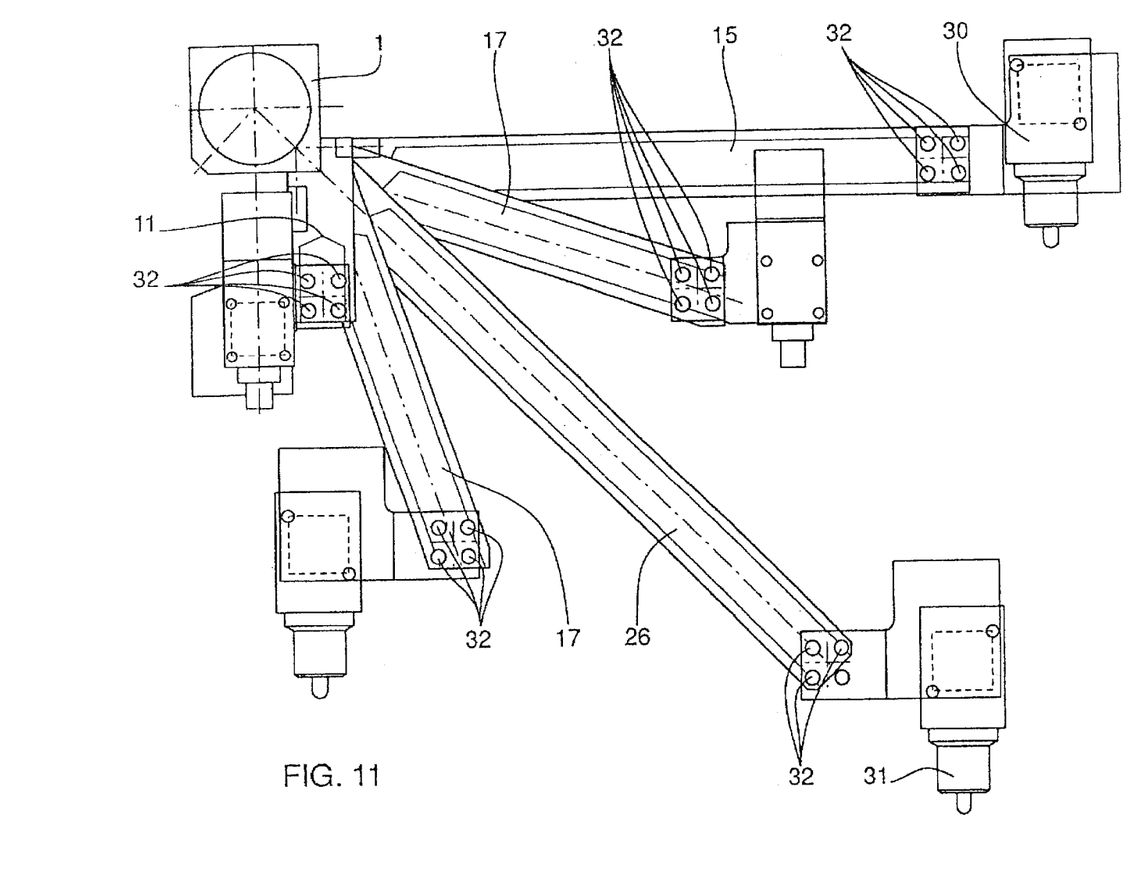
FIG. 11 shows schematically an elevational view of a third embodiment of a gripping device according to the invention.

With reference to FIG. 11, another embodiment of a device according to the invention comprises arms 15, 17, 26, 17 and 11 similar or functionally equivalent to the arms described with reference to FIG. 1, these arms being secured to a beam 1 in the manner described above.

The same positioning apparatus 30 is fixed at the end of each arm, so as to illustrate the different possibilities of mounting by using a same mounting accessory 31 at the end of each arm.

Each member 31 is mounted on its associated arm by screws coacting with tapped holes 32 provided in the corresponding arm. The tapped holes 32 provided in each arm shown are machined so as to define a geometric square parallel to the square of the cross-section of the beam 1. As a result, the mounting of a device according to the invention permits defining with precision a point of intersection of the diagonals of each square corresponding to the tapped holes 32. This point of intersection corresponds each time to one of the summits of the pattern described with reference to FIG. 1.

Measurements have shown that the device according to the invention permits obtaining a very much better rigidity of the gripping device than in the prior art and an invariable geometric positioning with better precision than that of the devices of the prior art.

Figure 12:
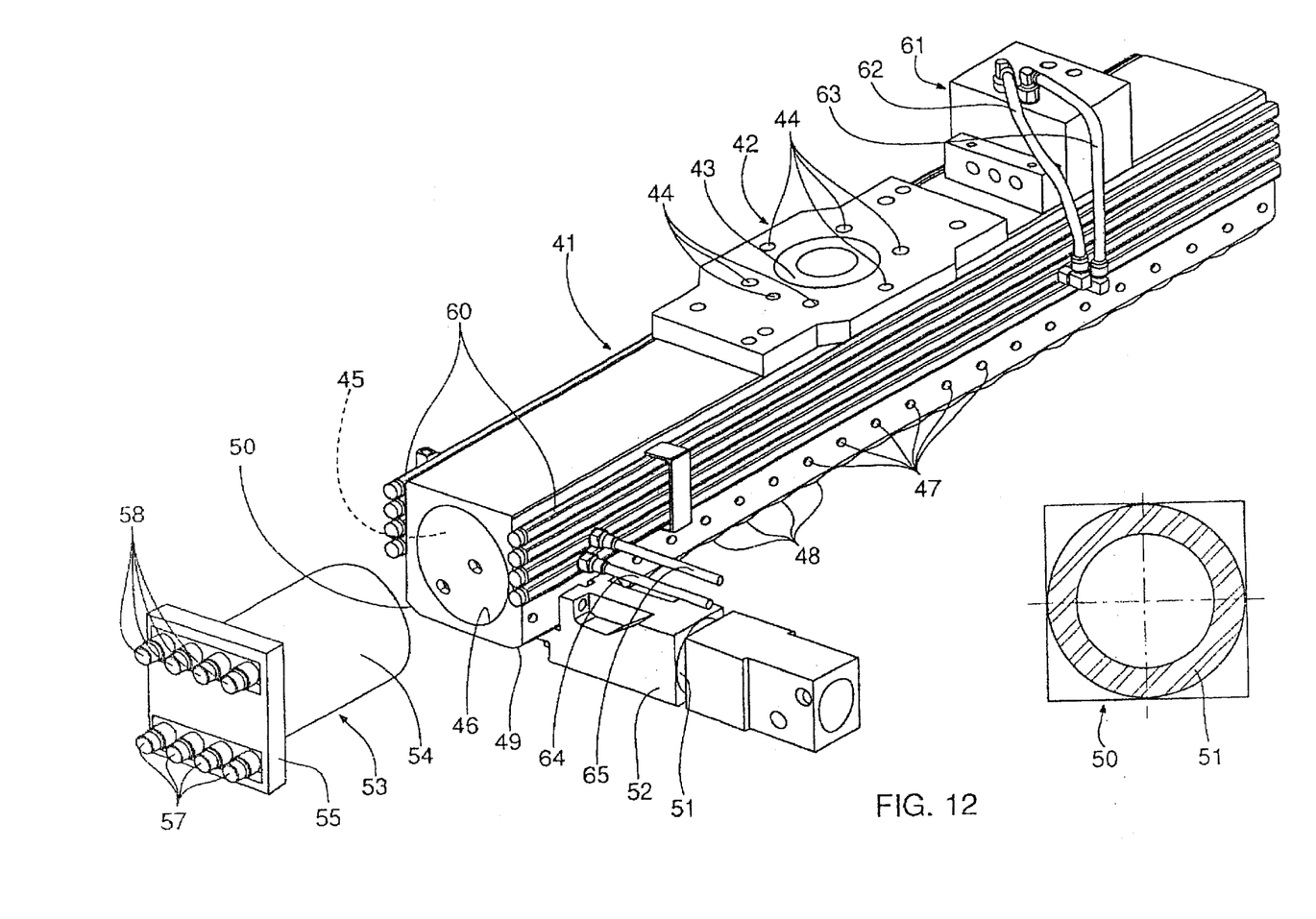
FIG. 12 shows schematically a fourth embodiment according to the invention in perspective with a cross-section of a detachable arm.

Referring to FIG. 12, a preferred embodiment of the device according to the invention comprises a hollow beam 41 seen in perspective. The hollow beam 41 is secured to a securement stay 42 at the end of a robot arm (not shown). The stay 42 comprises in known manner a plate 43 for centering on the arm of the robot (not shown) and at least six securement tapped holes 44 machined in the securement stay 42. The stay 42 is preferably secured to the beam 41 by screwing with positioning relative to the beam 41 by means of centering pins.

The beam 41 has a substantially square cross-section and has an internal recess 45 that can be closed by a removable cover 46. The beam 41 comprises on its side surfaces tapped holes such as 47, provided at regular intervals as well as centering machinings 48 disposed on the surface opposite to the stay 42. Bevils 49 and 50 are provided to permit the application of the arms against a side surface carrying tapped holes 47 and against the surface carrying the centering machined parts 48.

An arm 52 is thus mounted by means of suitable screws screwed into the tapped holes 47; the arm 52 is positioned on the centering machine parts 48, preferably in the form of substantially parallelepipedal formations.

The arm 52 is, in the illustrated example, a horizontal arm which comprises preferably a narrowed section 51 seen in cross-section.

This narrowed section 51 seen in cross-section permits breaking the arm in the case of shock against an obstacle or too great mechanical stress: this narrowed cross-section 51 thus has a "mechanical fuse" function, which permits, at the cost only of the breaking of the arm 50, not damaging all the device according to the invention.

The arm 52 is hollow and the resistive cross-section of the narrowed portion 51 is selected in a predetermined manner as a function of the force to be resisted by the end of the arm 52 and as a function of the selected breaking limit for the protection of the device according to the invention.

Preferably, it is provided that the internal recess 45 of the hollow beam 41 be accessible after removal of the cover 46, so as to receive a dividing housing 53 having a cylindrical portion 54 and an end portion 55 shaped as an end piece having a plurality of contacts 57 and 58.

This arrangement thus permits minimizing the length of the intertwined portions of the electrical cable supplying the electrical contacts that can be disposed at the ends of the arms of the device.

In the case of pneumatic gripping, it is preferably provided to mount on the beam 41 one or two pneumatic supplies 60 comprising a plurality of tubular conduits supplied from a distributor 61 by means of flexible tubing 62, 63. The supply 60 is thus supplied under pressure and permits distributing compressed air to pneumatic clamps as well as to remove the returned air directly from the supply 60, avoiding entangling the pneumatic conduits.

In the illustrated example, the supply 60 is provided to supply two take-offs 64 and 65 adapted to supply the pneumatic jack of a gripper (not shown) or of a positioning apparatus, or for equivalent handling of a piece of automotive body work.

The invention described with reference to several embodiments is in no way thereby limited, but on the contrary covers any modification of shape or variation of embodiment within the scope and spirit of the invention.

Thus, in the case of pneumatic gripping, there can be preferably mounted one or two pneumatic supplies 60 comprising a plurality of tubular conduits supplied by a distributor 61 by means of flexible tubing 62, 63 within the hollow interior of a beam 41. The supply 60 under pressure also permits in this embodiment to distribute compressed air to pneumatic grippers, by avoiding entangling of the pneumatic conduits.

The important thing is that the structure of the device according to the invention comprises an elongated beam having high inertia in torsion and in flexure equivalent to that obtained by using a beam of square section, and that the manner of securement that is used permits reaching a large spatial volume with a small number of arms, so as to reduce the stocks of arms necessary for practicing the invention.

What is claimed is:

1. Gripping device in the form of a holding and positioning assembly, adapted to be mounted on a robot arm and suited for grasping and positioning a piece of automobile body work, comprising:
    a central beam (1) having high characteristics of inertia in flexure and in torsion;
    said central beam comprising a predetermined first indexing configuration along a first rectangular dihedral; and
    at least one arm (11–27) adapted to support a positioning, holding or gripping member,
    each said arm (11–27) comprising a second rectangular dihedral with a second indexing configuration coacting with said predetermined first indexing configuration,
    said first and second dihedrals being rigidly connected and positioned relative to each other by said first and second indexing configurations upon securement of each arm to the beam by non-slidable screwing means.

2. Device according to claim 1, characterized in that the central beam (1) is hollow, so as to lighten the central beam (1) whilst maintaining good characteristics of inertia in flexure and in torsion.

3. Device according to claim 1, wherein the beam further comprises a securement stay (2) for mounting to the robot arm and, on a side opposite to the stay (2), a plurality of regularly spaced indexing configurations (8).

4. Device according to claim 1, characterized in that the indexing configurations (8) comprise at least one tenon and at least one mortis substantially in the form of right prisms.

5. Device according to claim 1, characterized in that each arm (17–27) comprises, at an end opposite to the central beam (1), securement means to secure a member for positioning, holding or gripping a piece of automobile body work.

6. Device according to claim 5, characterized in that each arm comprises a narrowed section (51) permitting breaking the arm in the case of shock against an obstacle or of too great mechanical stress.

7. Device according to claim 1, characterized in that each arm (17–27) is reversible, so as to limit the number of arms.

8. Device according to claim 1, characterized in that the device comprises at least one pneumatic supply (60) comprising a plurality of tubular conduits supplied by a distributor (61).

9. Device according to claim 1, characterized in that the indexing configurations (8) comprise at least one tenon and at least one mortis substantially in the form of right prisms, substantially parallelepipedal.

10. Device according to claim 1, characterized in that the device comprises at least one pneumatic supply (60) comprising a plurality of tubular conduits supplied by a distributor (61) and secured to the central beam (1).

11. A gripping device, comprising:
    a securement base (2) adapted for connection to a robot arm;
    a hollow central beam (1) secured on one face to the securement base, and having high characteristics of inertia in flexure and in torsion;
    screw-threaded holes (6, 7) at regular intervals along a length of an exterior side surface of the beam;
    at least one modular, hollow arm (11–27) detachably secured to the beam and adapted to support a member for positioning, holding or gripping a piece of automobile body work;
    centering parts (8) located intermediate the screw-threaded holes, the centering parts having a rectangular dihedral shape and indexed to mount the arm against the beam; and
    a gripping element detachably mounted to a distal end of the arm.

12. The device of claim 11, wherein,
    the beam has a hollow, square cross-section, with bevels provided at corners of the cross-section to permit application of arms (11–27) to the exterior side surface of the beam having the screw-threaded holes and the machine centering parts, two pairs of screw-threaded holes and a corresponding intermediate centering part supporting one arm.

13. The device of claim 11, comprising plural modular arms mounting along the exterior side surface of the beam, the modular arms being of differing spans and permitting achieving variable spans with a regular pattern.

14. The device of claim 13, wherein there are sixteen different arms attachable to the beam having lengths between 500 mm and 3 m.

15. The device of claim 11, wherein,
   the centering parts are substantially parallelepipedal, on a lower surface substantially in a medial plane of two consecutive screw-thread holes; and
   an end of the arm, mounting against the centering parts, having a rectangular dihedral shape and a groove shape for coactingly mounting with the centering part.

16. The device of claim 11, wherein the gripping element is one of:
   a CNOMO gripper, oriented inwardly; and
   a CNOMO gripper oriented outwardly.

17. The device of claim 11, wherein,
   the securement base is centered along the beam, and the beam carries plural arms;
   further comprising two end cross-pieces (28, 29) with elements to center the arm on a fixed tool; and
   each arm carries an accessory for mounting an apparatus for gripping, positioning or folding an element of automobile body work.

18. A holding and positioning assembly for grasping and positioning a piece of automobile body work, comprising:
   a securement base mountable to a robot arm;
   a hollow, central beam attached to the securement base and comprising plural predetermined first indexing configurations along a first rectangular dihedral; and
   plural arms (11–27) adapted to support detachable positioning, holding and gripping members,
   each said arm (11–27) comprising a second rectangular dihedral with a second indexing configuration coacting with said predetermined first indexing configurations,
   said first and second dihedrals being rigidly connected and positioned relative to each other by said first and second indexing configurations upon securement of each arm to the central beam by non-slidable screws.

* * * * *